US010255503B2

(12) United States Patent
Cremonesi et al.

(10) Patent No.: US 10,255,503 B2
(45) Date of Patent: Apr. 9, 2019

(54) ENHANCED CONTENT-BASED MULTIMEDIA RECOMMENDATION METHOD

(71) Applicant: POLITECNICO DI MILANO, Milan (IT)

(72) Inventors: Paolo Cremonesi, Milan (IT); Mehdi Elahi, Milan (IT); Yashar Deldjoo, Lodi (IT)

(73) Assignee: POLITECNICO DI MILANO, Milan (IT)

( * ) Notice: Subject to any disclaimer, the term of this patent is extended or adjusted under 35 U.S.C. 154(b) by 109 days.

(21) Appl. No.: 15/277,490

(22) Filed: Sep. 27, 2016

(65) Prior Publication Data

US 2018/0089513 A1 Mar. 29, 2018

(51) Int. Cl.
| | |
|---|---|
| *G06K 9/62* | (2006.01) |
| *G06K 9/64* | (2006.01) |
| *G06K 9/00* | (2006.01) |
| *G06K 9/52* | (2006.01) |
| *G06K 9/46* | (2006.01) |

(52) U.S. Cl.
CPC ..... *G06K 9/00718* (2013.01); *G06K 9/00744* (2013.01); *G06K 9/52* (2013.01); *G06K 9/4652* (2013.01); *G06K 9/6263* (2013.01)

(58) Field of Classification Search
CPC .... H04N 21/25; H04N 21/251; H04N 21/252; H04N 21/254; H04N 21/2541; H04N 21/2542; H04N 21/2543; H04N 21/25435; H04N 21/2547; H04N 21/258; G06F 17/30828; G06K 9/00718; G06K 9/00744; G06K 9/52; G06K 9/00724; G06K 9/00731; G06K 9/00711; G06K 9/00677; G06K 9/00684; G06K 9/00691; G06K 9/00697; G06K 9/00704; G06K 9/00751; G06K 9/00771; G06K 9/522; G06K 9/525; G06K 9/527
USPC ........ 382/103, 219–220, 155, 224–228, 165, 382/170; 707/740
See application file for complete search history.

(56) References Cited

U.S. PATENT DOCUMENTS

| | | | |
|---|---|---|---|
| 6,741,655 B1 | 5/2004 | Chang et al. | |
| 2006/0288074 A1* | 12/2006 | Rosenberg | ........... G06Q 20/102 709/205 |
| 2008/0147711 A1* | 6/2008 | Spiegelman | ........ G06F 17/3002 |
| 2009/0006368 A1 | 1/2009 | Mei et al. | |
| 2009/0226046 A1* | 9/2009 | Shteyn | ............... G06K 9/00711 382/118 |

(Continued)

FOREIGN PATENT DOCUMENTS

| | | | | |
|---|---|---|---|---|
| KR | 2008/0107143 A | 12/2008 | | |
| WO | WO-2014002064 A1 * | 1/2014 | ....... | G06F 17/30017 |
| WO | 2014054025 A | 4/2014 | | |

*Primary Examiner* — Vincent Rudolph
*Assistant Examiner* — Stephen Brinich
(74) *Attorney, Agent, or Firm* — Young & Thompson

(57) ABSTRACT

There is disclosed a method for generating movie recommendations, based on automatic extraction of features from a multimedia content, wherein the extracted features are visual features representing mise-en-scène characteristics of the movie defined on the basis of Applied Media Aesthetic theory, said extracted features being then fed to content-based recommendation algorithm in order to generate personalized recommendation.

9 Claims, 2 Drawing Sheets
(2 of 2 Drawing Sheet(s) Filed in Color)

*An example of red hue used to increase the sense of violence in Django Unchained - 2012 (left), and an example of blue tone used to produce the sense of coldness and fatigue in Lincoln - 2012 (right).*

(56) References Cited

U.S. PATENT DOCUMENTS

2012/0102033 A1    4/2012  Sarshar et al.
2012/0197897 A1\*  8/2012  Knight .............. G06F 17/30029
                                                              707/740

\* cited by examiner

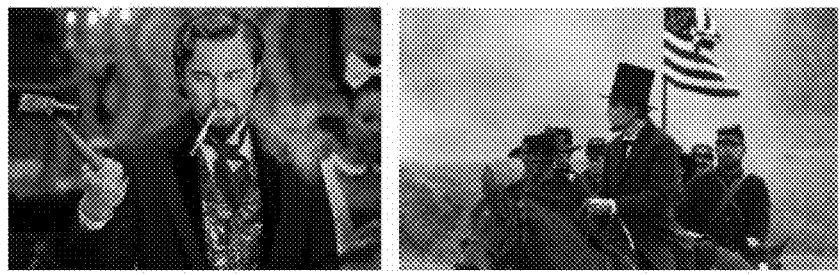

Fig. 2
*An example of red hue used to increase the sense of violence in Django Unchained - 2012 (left), and an example of blue tone used to produce the sense of coldness and fatigue in Lincoln - 2012 (right).*

Fig. 1
*An example of highly contrasted lighting to emphasise on an unnatural effect, as the borders of objects are altered by the lights, in Out of the past - 1947 (left), and flat lighting which is neutral and realistic way of illuminating, to enable recognition of stage objects, in The wizard of OZ - 1939 (right)*

US 10,255,503 B2

ENHANCED CONTENT-BASED MULTIMEDIA RECOMMENDATION METHOD

FIELD OF INVENTION

The present invention relates to a multimedia recommendation method and specifically to content-based multimedia recommendation method.

BACKGROUND ART

Recommender systems (RSs) are powerful automatic tools that help users find interesting multimedia content (e.g., movie, music, games, . . . ) from wide storage directories and online media services.

RSs are characterized by the capability of filtering large information spaces and selecting the items that are likely to be more interesting and attractive to a specific user. Particularly, they play a significant role in on-demand TV channels, IP Television and video-on-demand web applications (e.g. YouTube and Netflix) where very large catalogues of movies are available to the users: the main goal of RSs is to find and recommend to users the movies that are likely to be interesting to them. In other words, the RSs shall match the features of a number of video items with a profile of the intended users, so as to rank the items in their order of preference to the user.

Recommendation systems can rely substantially on two different approaches, either collaborative systems—requiring interaction with and between the users—or content-based systems—where suggestions are given based on a number of known features of the items. In the present application, only this second approach is considered.

A prerequisite for content-based RSs is the availability of information about "explicit" content features of the items. In movie items, such features are associated to the items as structured meta-information (e.g., movie genre, director, cast and so on) or unstructured meta-information (e.g., plot, tags and textual reviews).

As it is apparent, this requirement represents one of the main concerns of these systems, since collecting appropriate information about features is a time and resource consuming task which, in the best conditions, at least results in a time delay between the availability of the item and when it is properly tagged to be used in a RS. This is often called also "cold start" problem, which result in poor recommendations when many items, without proper meta-tags, are entered in the catalogue in a short time delay.

Accordingly, there is a demand for a recommendation system which is able to automatically detect a number of relevant features from the item to be suggested.

The prior art already provides a number of systems aimed to obtain an automatic recommendation using a content-based RSs.

For example, KR20080107143 discloses a method for recommending music and a moving picture based on an audio fingerprint technology using signal processing.

US20120102033 discloses a learning system using loosely annotated multimedia data on the web, analyses it in various signal domains and builds an association graph which basically comprises visual signals, audio signals, text phrases and the like that capture a multitude of objects, experiences and their attributes and the links among them.

WO 2014054025 discloses a method for recommending multimedia contents through a multimedia platform comprising a plurality of multimedia contents observable through at least one user interface.

US 20090006368 is describing a method wherein the source videos are directly compared to a user selected video to determine relevance, which is then used as a basis for video recommendation.

All these systems are still not satisfactory since they take into consideration too many aspects of an item, resulting in a rather complex dataset which it is then difficult to handle and gives non reliable results. Some of them require still a certain manual intervention.

Moreover, U.S. Pat. No. 6,741,655 discloses a recognition system for permitting a user to locate one or more video objects from one or more video clips over an interactive network.

SUMMARY OF THE INVENTION

The object of the invention is therefore to provide a recommendation system which is able to determine automatically some content features of video items and handle them for the purpose of giving a satisfying recommendation to the users.

The new system and method of the invention comprises automatic extraction of stylistic visual features of movies (based on mise-en-scène characteristics), and also audio features, in the context of recommender systems.

The proposed method and system represent a multimedia recommender system that automatically analyse movie contents and extracts a set of representative stylistic visual and audio features defined by the Applied Media Aesthetic theory and principles (see, for example, H. Zettl. "Essentials of applied media aesthetics." in C. Dorai and S. Venkatesh, editors, Media Computing, volume 4 of The Springer International Series in Video Computing, pages 11-38. Springer US, 2002), that is concerned with the relation of aesthetic media attributes (such as light, camera movements, and colours) with the perceptual reactions they are able to evoke in consumers of media communication, mainly movies.

In other words, it is provided a stylistic-based movie recommendation technique, exploiting "implicit" content characteristics of items, i.e., features that are "encapsulated" in the items and can be computationally "extracted" from them. Indeed, it has been noted that two movies can belong to the same genre, but they can be perceived differently by a user based on the movie style. For example, "The Fifth Element" and the "War of the Worlds" are both sci-fi (science/fiction) movies about an alien invasion; however, they are shot completely different, with Luc Besson (The Fifth Element) using bright colours while Steven Spielberg (War of the Worlds) preferring dark scenes. Although a viewer may not consciously notice the two different movie styles, they still affect the viewer's experience of the movie.

There are countless ways to create a movie based on the same script simply by changing the mise-en-scène. Furthermore, mise-en-scène characteristics of the movies can bring additional benefits to RS. For example, mise-en-scène can be used to tackle with the cold start problem mentioned above, which occurs when the system is unable to accurately recommend a new item to the existing users: this is a situation that typically occurs in social movie-sharing web applications (e.g., YouTube) where every day, hundred millions of hours of videos are uploaded by users and may contain no meta-data. Traditional techniques would fail to effectively recommend these new items even if they may be relevant for recommendation purposes, as the recommender has no content to analyse but video files.

The method of the invention is based on the assumption that the automatically extracted visual features can be viewed as aesthetics variables that contribute to establish the meaning conveyed by an artistic work to the users. Since humans respond to certain visual stimuli in ways that are predictable (up to a given extent), similar stimuli, generated by aesthetics variables, are expected to provoke similar reactions in humans. The Applied Media Aesthetic theory tries to identify aesthetics variables that operate to produce the desired effect in communicating emotions and meanings by analysis of media production tools such as cameras, lenses, lighting, etc.

As an example of such aesthetics variables, lighting in movies can be used for various purposes. FIG. 1 shows two examples of using lighting in movies to create different effects: high contrast lighting puts the emphasis on an "unnatural effect", as the borders of objects are altered by the lights; flat lighting, on the other hand, is an almost "neutral and realistic" way of illuminating, whose purpose is to enable recognition of stage objects. Another example is the use of colours in movies. The expressive quality of colours is closely related to that of lighting, sharing the same ability to set or magnify the feeling derived by a given situation. FIG. 2 shows two examples of using colours in movies for different purposes: red hue is used to increase the scene sense of violence, and blue tone is used to produce the sense of coldness and fatigue experienced by the characters.

These aesthetic variables can be computed from the video data stream as statistical values through appropriate analysing and optimization techniques, which will be described in more detail in the following.

BRIEF DESCRIPTION OF THE DRAWINGS

The file of this patent contains at least one drawing executed in color. Copies of this patent with color drawings will be provided by the Patent and Trademark Office upon request and payment of the necessary fee.

Further features and advantages of the invention will become more evident from the following detailed description of a preferred embodiment, given as a non-limiting example and illustrated in the accompanying drawings, wherein:

FIG. 1 is a comparison view, showing two different mise-en-scène taken from different movies;

FIG. 2 is a comparison view analogous to FIG. 1; and

DETAILED DESCRIPTION OF A PREFERRED EMBODIMENT

Figure 3:
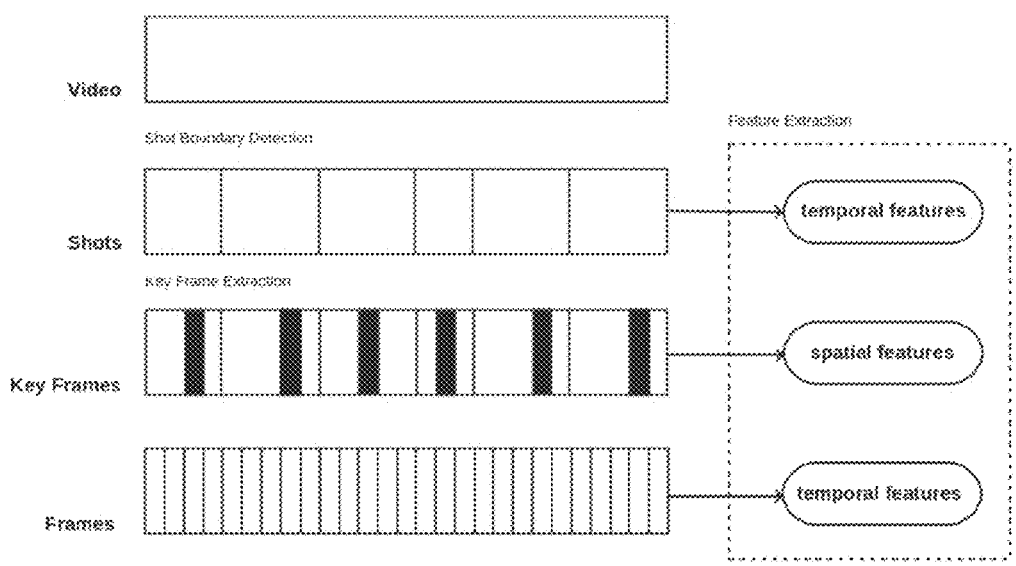
FIG. 3 is a diagram showing a hierarchical video representation and feature extraction according to the method of the invention.

In general, a movie M is represented as a combination of three main modalities: $M_V$ the visual, $M_A$ the audio and $M_T$ the textual modalities respectively. While the method of the invention can be based on extraction and use of all modalities, in movie recommendation, the essential features of the invention, on which the following description is focused on, is visual modality and the visual features that can be representative of this modality, as one example of extractable modality.

For any movie, it can be noted that $M=M(M_V)$, where M is the characterization of a movie. The visual modality itself can be represented as $$M_V = M_V(f_v) \tag{1}$$

where $f_v = (f_1, f_2, \ldots, f_n)$ is a set of features that describe the visual content of a video.

One of the main problem of the movie features extraction is that of keeping computationally feasible the process, through determining the appropriate portion of the movie to be analysed and defining the right metric for acquiring significant digital features of the frames belonging to that portion.

Generally speaking, a video can be considered as contiguous sequence of many frames. Consecutive video frames contain a lot of frames that are highly similar and correlated. Considering all these frames for feature extraction not only does not provide new information to the system but also is computationally inefficient.

Therefore, the first step prior to feature extraction is structural analysis of the video, i.e. to detect shot boundaries and to extract a key frame within each shot. A shot boundary is a frame where frames around it have significant difference in their visual content.

On the other hand, frames within a shot are highly similar each other, therefore it makes sense to take one representative frame in each shot and use that frame for feature extraction. This frame is called the Key Frame.

FIG. 3 illustrates the hierarchical representation of a video. Two types of features are extracted from videos: (i) temporal features, (ii) spatial features.

The temporal features reflect the dynamic perspectives in a video, such as the average shot duration (or shot length) and object motion, whereas the spatial features illustrate static properties such as colour, light, etc.

According to a preferred embodiment of the invention, after carefully studying the literature in computer vision and having performed various effectiveness tests, the inventors selected the five most informative and distinctive features to be extracted from each video, i.e.

$$f_v = (f_1, f_2, f_3, f_4, f_5) \tag{2}$$
$$= \left(\overline{L}_{sh}, \mu_{cv}, \mu\overline{m}, \mu_{\sigma_m^2}, \mu_{lk}\right)$$

where $\overline{L}_{sh}$ is the average shot length, $\mu_{cv}$ is the mean colour variance over key frames, $\mu\overline{m}$ and $\mu_{\sigma_m^2}$ are the mean motion average and standard deviation across all frames respectively and $\mu_{lk}$ is the mean lighting key over key frames.

As can be noted, some of the features are calculated across key frames and the others across all video frames (see FIG. 3). Each of these features carry a meaning and are used in the hands of able directors to convey emotions when shooting movies. Assuming that there exists $n_f$ frames in the video, t being the index of each single frame and $n_{sh}$ key frames (or shots), q being the index of a numbered list of key frames, the proposed visual features and how they are calculated is presented in the following.

(1) Average Shot Length ($\overline{L}_{sh}$).

A shot is a single camera action and the number of shots in a video can provide useful information about the pace at which a movie is being created. The average shot length is defined as $$\overline{L}_{sh} = \frac{n_f}{n_{sh}} \tag{3}$$

where $n_f$ is the number of frames and $n_{sh}$ the number of shots in a movie. For example, action movies usually contain rapid movements of the camera (therefore they contain higher number of shots or shorter shot lengths) compared to dramas which often contain conversations between people (thus longer average shot length). Because movies can be made a different frame rates, $\overline{L}_{sh}$ is further normalized by the frame rate of the movie.

(2) Colour Variance ($\mu_{cv}$)

The variance of colour has a strong correlation with the genre. For instance, directors tend to use a large variety of bright colours for comedies and darker hues for horror films. In this context, it shall be noted that reference has been done to a colour space, i.e. a mathematical model for describing colours using a tuple of numbers (e.g. 3-tuple like RGB colour space or 4-tuple as in CMYK colour space); some colour spaces are popular in digital video due to their ability to handle video information. The present inventors have preferred to use CIE 1976 (L*, u*, v*) colour space, commonly known also as CIELUV, for computing "colour variance" in a video frame, because this colour space can perceptually approach a uniform colour space: this means that taking two points in the CIELUV space and calculating their Euclidean distance, their distance is close to their perceptual difference; it is also advantageous because it describes all the colours visible to the human eye: for these reasons, this colour space is said to be better able to describe human vision. For each key frame represented in $L_{uv}$ colour space, the following covariance matrix is computed:

$$\rho = \begin{pmatrix} \sigma_L^2 & \sigma_{Lu}^2 & \sigma_{Lv}^2 \\ \sigma_{Lu}^2 & \sigma_u^2 & \sigma_{uv}^2 \\ \sigma_{Lv}^2 & \sigma_{uv}^2 & \sigma_v^2 \end{pmatrix} \quad (4)$$

where $\sigma_L$, $\sigma_u$, $\sigma_v$, $\sigma_{Lu}$, $\sigma_{Lv}$ and $\sigma_{uv}$ are the standard deviation over three channels L, u, v and their mutual covariance.

The generalized variance can be used as the representative of the colour variance in each key frame given by $$\Sigma_q = \det(\rho) \quad (5)$$

in which a key frame is a representative frame within a shot (e.g. the middle shot). The average colour variance is then calculated by $$\mu_{cv} = \frac{\sum_{q=1}^{n_{sh}} \Sigma_q}{n_{sh}} \quad (6)$$

where $n_{sh}$ is the number of shots equal to number of key frames.

It shall be further considered that all these operations on the movie images are actually performed on the digital space made by the pixel array of each frame.

(3) and (4) Motion

Motion within a video can be caused mainly by the camera movement (i.e. camera motion) or movements on part of the object being filmed (i.e. object motion). While the average shot length captures the former characteristic of a movie, it is desired for the latter characteristic to be also captured. A motion feature descriptor based on optical flow (see for example J. L. Barron, D. J. Fleet, and S. S. Beauchemin. 'Performance of optical flow techniques'. International journal of computer vision, 12(1):43-77, 1994, and B. K. Horn and B. G. Schunck. 'Determining optical flow'. In 1981 Technical Symposium East, pages 319-331. International Society for Optics and Photonics, 1981) is used to measure a robust estimate of the motion in sequence of images based on velocities of images being filmed. Because motion features are based upon sequence of images, they are calculated across all video frames.

At frame t, if the average motion of pixels is represented by $\overline{m}_t$ and the standard deviation of pixel motions is $(\sigma_m^2)_t$:

$$\mu_m = \frac{\sum_{t=1}^{n_f} \overline{m}_t}{n_f} \quad (7)$$

and $$\mu_{\sigma_m^2} = \frac{\sum_{t=1}^{n_f} (\sigma_m^2)_t}{n_f} \quad (8)$$

where $\mu_{\overline{m}}$ and $\mu_{\sigma_m^2}$ represent the average of motion mean and motion standard deviation aggregated over entire $n_f$ frames.

(5) Lighting Key

Lighting key is another distinguishing factor between movie genres in such a way that the director use it as a factor to control the type of emotion they want to be induced to a viewer. For example, comedy movies often adopt lighting key which has abundance of light (i.e. high grey-scale mean) with less contrast between the brightest and dimmest light (i.e. high grey-scale standard deviation): this trend is often known as high-key lighting.

On the other hand, horror movies or noir films often pick grey-scale distributions which is low in both grey-scale mean and grey-scale standard deviation, known by low-key lighting. In order to capture both of these parameters, after transforming all key-frames to HSV colour-space, it is computed the mean p and standard deviation σ of the "value" component which corresponds to the lightness/brightness in the HSV colour space.

In this context, with HSV colour space it is meant the one having components corresponding to "colour", "saturation" and "value". HSV colour space is preferably used for calculating "Lighting Key" in a video frame because it gives a component directly related to lightness or brightness "V" (Value) of the scene which is of interest for computing "lighting key" (as opposed with RGB colour space which does not contain such information).

To summarize, colour space has been used for computing features related to static features in an image: colour space is used to compute "colour variance" and "lighting key" (their mean and standard deviation), while colour space is not needed in order to compute "motion" and "shot length" (their mean and standard deviation).

The scene lighting key ξ defined by multiplication of μ and σ is used to measure the lighting of key frames $$v_q = \mu \cdot \sigma \quad (9)$$

For instance, comedies often contain key-frames which have a well distributed grey-scale distribution which results in both the mean and standard deviation of grey-scale values to be high: therefore for comedy genre one can state $\xi > \tau_c$, whereas for horror movies the lighting key with poorly distributed lighting the situation is reverse and we will have $\xi < \tau_h$ where $\tau_c$ and $\tau_h$ are predefined thresholds. In the situation where $\tau_h < \xi < \tau_c$ other movie genres (e.g. Drama)

exists where it is hard to use the above distinguish factor for them. The average lighting calculated over key frames is given by $$\mu_{lk} = \frac{\sum_{q=1}^{n_{sh}} \xi_q}{n_{sh}} \qquad (10)$$

The above visual features extracted from the movies are then fed to a content-based recommendation algorithm in order to generate personalised recommendation. A preferred example of such algorithms is "k-nearest neighbour" (knn), which is described below.

Given a set of users u∈U and a catalogue of items i∈I, a set of preference scores $r_{ui}$ given by user u to item i is collected. Moreover, each item i∈I is associated to its audio-visual feature vector $f_i$, extracted based on the method explained above. For each couple of items i and j, the similarity score $s_{ij}$ is computed using cosine similarity:

$$s_{ij} = \frac{f_i^T f_j}{\|f_i\| \|f_j\|} \qquad (11)$$

For each item i the set of its nearest neighbours $NN_i$ is built, $|NN_i| < K$.

Finally, for each user u∈U, the predicted preference score $\hat{r}_{ui}$ for an unseen item i is computed as follows $$\hat{r}_{ui} = \frac{\sum_{j \in NN_i, r_{uj} > 0} r_{uj} s_{ij}}{\sum_{j \in NN_i, r_{uj} > 0} s_{ij}} \qquad (12)$$

The above score result can then be made accessible to the user by means of a variety of interfaces, depending on the type of system which is being considered, for example display means such as an IPTV interface, or web services, or plain http on a client such as a browser.

As it can be clearly perceived from the above, the invention supplies a solution to the technical problems stated in the preamble. In particular, the invention is an effective solution to the cold start problem, and more particularly new item problem in recommender systems (where the prior art methods may completely fail).

Moreover, the method of the invention can be seen not only from Multimedia Recommender System point of view, but also from the Multimedia Search and Retrieval point of view. Accordingly, the audio-visual features can be used by any multimedia search engine to enable users to search, filter, and find multimedia items based on their aesthetic audio-visual aspects. For example, the invention enables novel search queries from users, such as finding suitable movies that include emotional mise-en-scene preferred by the user (e.g., they are dark or contain a lot of fast motions such as car chasing or explosions); tt also allows even more complex queries, such as finding movies that were made with a certain style (e.g., "Hitchcock Style").

It is understood that the above description is provided as a way of example and that the practical ways of implementation or the changes made by a person skilled in the field may differ without departing from the scope of protection as defined in the following claims.

Although the invention is a sharp solution to the cold start problem situation, it can also function properly in other situations. Indeed, if the multimedia item is not new and hence there are available meta-data (such as tag, review, genre, rating, etc.) the method proposed in the application can still hybridize the recommender system and significantly "improve" the quality. Hence, it can combine (or perform fusion of) the above audio-visual features with available meta-data and increase the quality of the recommendations: in this case, it becomes a "Hybrid" method.

The invention claimed is:

1. A method implemented by a multimedia recommender system for automatically generating movie recommendations from multimedia content, comprising:
   identifying, within a movie stream of a video of the multimedia content, a plurality of shots;
   defining a single key frame within each one of said shots;
   automatically extracting, from the key frames of the plurality of shots, visual features representing mise-en-scène characteristics of the video defined on the basis of Applied Media Aesthetic theory; and
   feeding said extracted visual features to a content-based recommendation algorithm that generates personalised recommendation information concerning said multimedia content from the extracted visual features,
   wherein said visual features extracted from the video belong to a visual modality $M_v$ defining the characterization of a movie $M=M(M_V)$, where $$M_V = M_V(f_v)$$

and $$f_v = (\overline{L}_{sh}, \mu_{cv}, \overline{\mu^m}, \mu_{\sigma_m^2}, \mu_{lk}),$$

where
   $\overline{L}_{sh}$ is the average shot length in the video,
   $\mu_{cv}$ is the mean colour variance over the defined key frames of plurality of shots of the video,
   $\overline{\mu^m}$ and $\mu_{\sigma_m^2}$ are, respectively, the mean motion average and standard deviation across all frames of the video, and
   $\mu_{lk}$ is a mean lighting key over said key frames,
   wherein the generated personalised recommendation information is output to a user by way of any of a display, a web service, and via plain http for rendering by a client application.

2. The method according to claim 1, wherein the client application is a browser.

3. The method according to claim 1, wherein the display is an IPTV interface.

4. The method according to claim 1, wherein extracted visual features for a video unseen by a user are fed to a content-based recommendation algorithm that generates a preference score for the unseen video based on the extracted visual features and a set of preference scores given by the user.

5. The method according to claim 1, wherein the mean lighting key over said key frames $\mu_{lk}$ is given by:

$$\mu_{lk} = \frac{\sum_{q=1}^{n_{sh}} \xi_q}{n_{sh}},$$

where $$\xi_q = \mu \cdot \sigma.$$

6. A multimedia recommender system for automatically generating movie recommendations from multimedia content, configured to:
- identify, within a movie stream of a video of the multimedia content, a plurality of shots;
- define a single key frame within each one of said shots;
- automatically extract, from the key frames of the plurality of shots, visual features representing mise-en-scene characteristics of the video defined on the basis of Applied Media Aesthetic theory; and
- feed said extracted visual features to a content-based recommendation algorithm that generates personalised recommendation information concerning said multimedia content from the extracted visual features, wherein said visual features extracted from the video belong to a visual modality $M_v$ defining the characterization of a movie $M=M(M_V)$, where $$M_V=M_V(f_v)$$

and $$f_v=(\overline{L}_{sh}, \mu_{cv}, \overline{\mu^m}, \mu_{\sigma_m^2}, \mu_{lk}),$$

where
- $\overline{L}_{sh}$ is the average shot length in the video,
- $\mu_{cv}$ is the mean colour variance over the defined key frames of plurality of shots of the video,
- $\overline{\mu^m}$ and $\mu_{\sigma_m^2}$ are, respectively, the mean motion average and standard deviation across all frames of the video, and
- $\mu_{lk}$ is a mean lighting key over said key frames, wherein the generated personalised recommendation information is output to a user by way of any of a display, a web service, and via plain http for rendering by a client application.

7. The system according to claim 6, wherein the client application is a browser.

8. The system according to claim 6, wherein the display is an IPTV interface.

9. The system according to claim 6, wherein the mean lighting key over said key frames $\mu_{lk}$ is given by:

$$\mu_{lk} = \frac{\sum_{q=1}^{n_{sh}} \xi_q}{n_{sh}},$$

where $$\xi_q = \mu \cdot \sigma.$$

* * * * *